United States Patent
Li

(10) Patent No.: US 10,472,782 B1
(45) Date of Patent: Nov. 12, 2019

(54) PORTABLE DUSTPAN STRUCTURE FOR CLEANING PET EXCREMENT

(71) Applicant: Yali Limited Company, Taichung (TW)

(72) Inventor: Nian-Zhao Li, Taichung (TW)

(73) Assignee: Yali Limited Company, Taichung (TW)

( * ) Notice: Subject to any disclaimer, the term of this patent is extended or adjusted under 35 U.S.C. 154(b) by 0 days.

(21) Appl. No.: 16/107,361

(22) Filed: Aug. 21, 2018

(30) Foreign Application Priority Data

Jul. 9, 2018 (TW) .............................. 107209223 U

(51) Int. Cl.
*E01H 1/12* (2006.01)
*A01K 23/00* (2006.01)

(52) U.S. Cl.
CPC .......... *E01H 1/1206* (2013.01); *A01K 23/005* (2013.01); *E01H 2001/1246* (2013.01); *E01H 2001/1293* (2013.01)

(58) Field of Classification Search
CPC .......... A01K 23/005; E01H 2001/1226; E01H 1/1206; E01H 2001/1293; E01H 2001/1246
See application file for complete search history.

(56) References Cited

U.S. PATENT DOCUMENTS

| D285,012 S | * | 8/1986 | Willis | ............................ 294/1.4 |
| 6,052,860 A | * | 4/2000 | Coxsey | ................... A47L 13/52 |
| | | | | 141/316 |
| 6,478,351 B1 | * | 11/2002 | Nelson | .................. E01H 1/1206 |
| | | | | 15/257.2 |
| 2005/0071943 A1 | * | 4/2005 | Liu | .......................... A47L 13/52 |
| | | | | 15/257.2 |
| 2013/0313842 A1 | * | 11/2013 | McNair | .................. E01H 1/1206 |
| | | | | 294/1.4 |
| 2014/0077511 A1 | * | 3/2014 | Endara | .................. E01H 1/1206 |
| | | | | 294/1.4 |
| 2014/0246445 A1 | * | 9/2014 | Lee | .......................... A47L 19/04 |
| | | | | 220/666 |

FOREIGN PATENT DOCUMENTS

JP          2006180984 A  *  7/2006

* cited by examiner

*Primary Examiner* — Stephen A Vu
(74) *Attorney, Agent, or Firm* — Wang Law Firm, Inc.

(57) ABSTRACT

A portable dustpan structure for cleaning pet excrement includes: a box body, a tubular member, a shaft and two roller units. The tubular member is pivotable relative to the box body to move between the upright position and the lie-flat position. When the tubular member is in the upright position, the mouth of the box body is upwards, the pet excrement won't fall out, and it can save space for easy storage. When the tubular member is in the lie-flat position, the pet owners can rake the pet excrement into the box body via the mouth so as to achieve of the purpose of cleaning. The dustpan further includes two roller units, so that the pet owner can move the dustpan by pulling the shaft, thereby improving the comfort of carrying object, moving without lifting, making the dustpan easy to carry and saving effort.

6 Claims, 5 Drawing Sheets

PORTABLE DUSTPAN STRUCTURE FOR CLEANING PET EXCREMENT

BACKGROUND

Field of the Invention

The present invention relates to a dustpan, and more particularly to a portable dustpan structure for cleaning pet excrement.

Related Prior Art

With the increasing popularity of pet keeping, owners often need to take their pets outdoors to allow their pets to take proper activities and excretion. However, due to the environmental protection requirement in the metropolitan area, owners must do the cleaning after their pets have excreted in order to avoid causing environmental mess.

Referring to FIG. 1, a cleaning tool set 10 includes a dustpan 11 and a broom 12 fixed to the dustpan 11. The dustpan 11 is approximately L-shaped, and includes a box 111, and a shaft 112 connected to the box 111. The broom 12 sweeps garbage or pet excrement into the box 111 through the opening of the box, so that the owner removes the excrement of the pet to achieve the purpose of cleaning.

However, when the owner uses the cleaning tool set, the pet excrement is likely to rolling out due to the opening direction of the box 111, so that the owner has to re-clean it again. Besides, the owner probably does not notice the pet excrement rolled out of the box 111, resulting in pollution to the environment.

Further, the rod 11 is fixed to the shaft 112 and cannot be folded or pivoted. Since the volume of the dustpan 11 cannot be minimized, the dustpan 11 will occupy a considerable space. Besides, the box 111 is often neglected, and pet owner is likely to be tripped and injured by the box 111, which is a potential danger.

In addition, the cleaning tool set 10 must be lifted and raised so that it can be moved, which becomes a burden when the owner walks, therefore, the cleaning tool set 10 is inconvenient to use and reduces the willingness of the owner to take out the door.

The present invention has arisen to mitigate and/or obviate the afore-described disadvantages.

SUMMARY

One objective of the present invention is to provide a portable dustpan structure for cleaning pet excrement, which is convenient to carry with less effort when the pet owner is walking.

To achieve the above objective, a portable dustpan structure for cleaning pet excrement is suitable for connecting a cleaning tool and comprises:

a box body having one end of the box body provided with a mouth, and another end of the box body provided with two supporting feet, wherein two sides of the box body are protrusively provided with two first positioning portions and two second positioning portions;

a tubular member pivotally disposed on the box body, and including an assembling portion capable of being assembled to the two first positioning portions or the two second positioning portions, and a connecting portion connected to the assembling portion, wherein the tubular member is able to pivot between an upright position and a lie-flat position, when the tubular member is in the upright position, the assembling portion is coupled to the two first positioning portions and aligned to the mouth, when the tubular member is in the lie-flat position, the assembling portion is coupled to the two second positioning portions and aligned to an outer surface of the box body;

a shaft having one end connected to the connecting portion of the tubular member, and another end provided with a clamping portion for insertion of the cleaning tool; and two roller units disposed at one end of the box body and aligned to the two supporting feet.

Preferably, the assembling portion and the connecting portion of the tubular member are integrally formed with each other.

Preferably, the box body further includes a scraping strip which is integrally formed at an edge of the mouth.

Preferably, a fixed angle is formed between the assembling portion and the connecting portion of the tubular member, and the tubular member is pivoted by the fixed angle.

Preferably, the two roller units each include two connecting legs disposed on the box body, and two rollers respectively connected to the two connecting legs.

Preferably, the cleaning tool is a flat rake or a broom.

Preferably, the box body is provided with a plurality of drain holes between the two supporting feet and the two roller units.

In this way, the present invention provides a portable dustpan structure for cleaning pet excrement, which essentially comprises: the box body, the tubular member, the shaft and the two roller units. The tubular member is pivotable relative to the box body to move between the upright position and the lie-flat position. When the tubular member is in the upright position, the mouth of the box body is upwards, the pet excrement won't fall out, and it can save space for easy storage. When the tubular member is in the lie-flat position, the pet owners can rake the pet excrement into the box body via the mouth so as to achieve of the purpose of cleaning.

In addition, the present invention is additionally provided with the two roller units, and the pet owner can move the dustpan by directly grasping and pulling the shaft, thereby improving the comfort of carrying object, moving without lifting, making the dustpan easy to carry and saving effort.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

Figure 1:
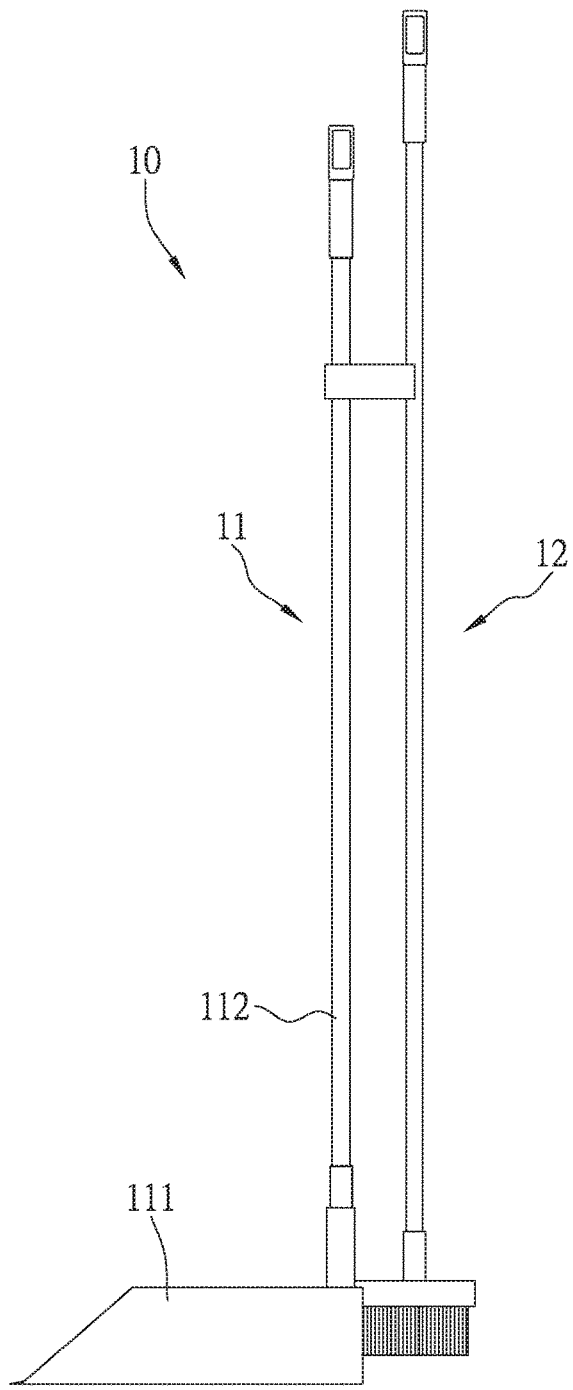
FIG. 1 is an illustrative view of a conventional cleaning tool set.
Figure 2:
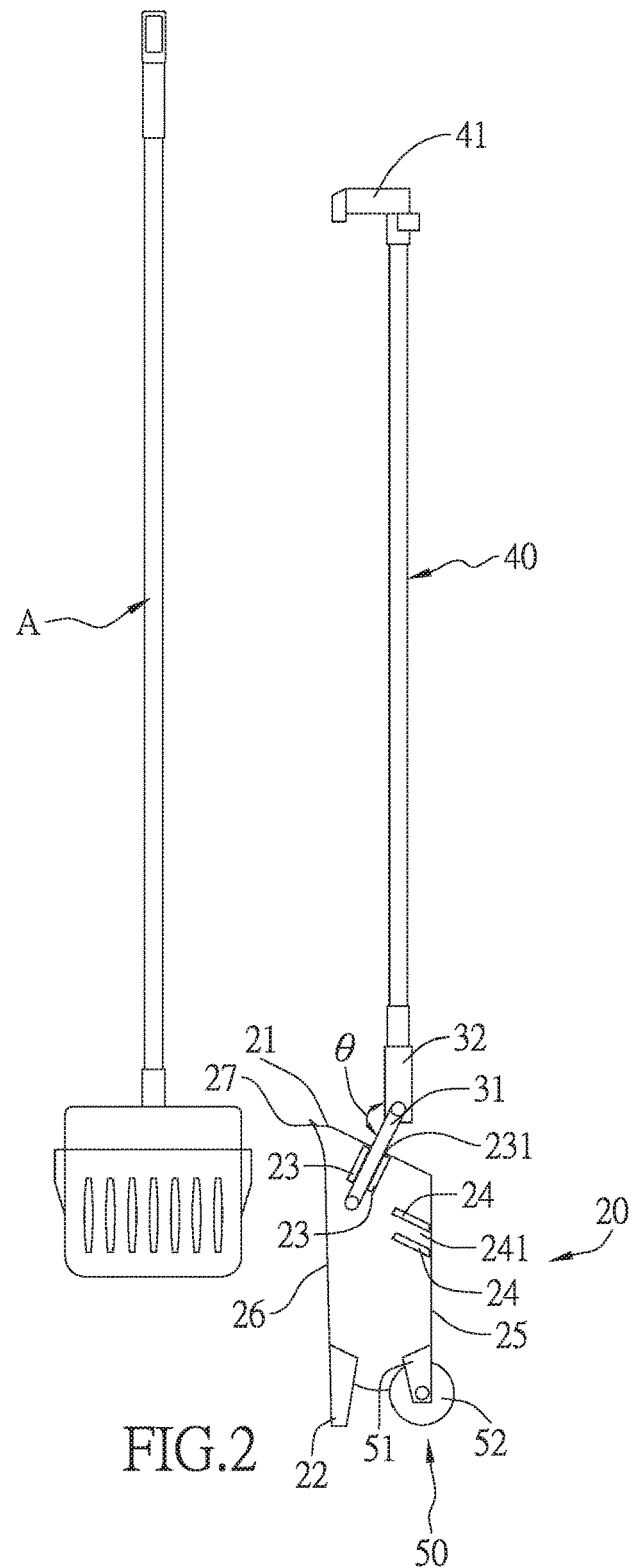
FIG. 2 is a perspective view of a portable dustpan structure for cleaning pet excrement in accordance with the present invention.

The present invention will be clearer from the following description when viewed together with the accompanying drawings, which show, for purpose of illustrations only, the preferred embodiment in accordance with the present invention.

Referring to FIGS. 2-5, a portable dustpan structure for cleaning pet excrement in accordance with the present invention is suitable for connecting a cleaning tool A. In this embodiment, the cleaning tool A is, but not limited to, a flat rake, it can also be a broom. The portable dustpan structure for cleaning pet excrement in accordance with the present invention essentially comprises: a box body 20, a tubular member 30, a shaft 40 and two roller units 50.

The box body 20 is a trapezoid three dimensional structure. One end of the box body 20 is provided with a mouth 21 communicating with outside, and another end of the box body 20 is provided with two supporting feet 22. Two sides of the box body 20 are protrusively provided with two first positioning portions 23, and two second positioning portions 24. In this embodiment, the box body 20 further includes a top surface 25 connected to the mouth 21, and a bottom surface 26 connected to the mouth 21 and opposite the top surface 25. A first positioning opening 231 is formed between the two first positioning portions 23, and a second positioning opening 241 is formed between the two second positioning portions 24. The arrangement of the two supporting feet 22 allows the box body 20 to stand up steadily. Further, the box body 20 further includes a scraping strip 27 which is integrally formed at an edge of the mouth 21 by the above-mentioned integral molding method, therefore, it has a greater stability, unlike the conventional combination, the use of the conventional structure is liable to cause breakage due to the structure. Therefore, the present invention increases the bearing strength, prevents fracture, improves the bearing capacity and achieves more practicability and durability, and is easy to produce in a low cost and economical way. Besides, the box body 20 is provided with a plurality of drain holes 28 between the two supporting feet 22 and the two roller units 50. When cleaning the box body 20, water can be drained out through the plurality of drain holes 28, so as to achieve an effective draining.

The tubular member 30 is approximately U-shaped and pivotally disposed on both sides of the box body 20, and has an assembling portion 31 capable of being assembled to the two first positioning portions 23 or the two second positioning portions 24, and a connecting portion 32 connected to the assembling portion 31. The assembling portion 31 and the connecting portion 32 of the tubular member 30 are integrally formed with each other, thereby simplifying the structure, reducing the manufacturing process and facilitating assembly, while providing sufficient strength to ensure overall stability. The tubular member 30 can be pivoted between an upright position P1 and a lie-flat position P2. Since the assembling portion 31 and the connecting portion 32 of the tubular member 30 are integrally formed with each other, a fixed angle θ is formed between the assembling portion 31 and the connecting portion 32, and the tubular member 30 is pivoted between the upright position P1 and the lie-flat position P2 by the fixed angle θ. When the tubular member 30 is in the upright position P1, the assembling portion 31 is coupled to the two first positioning portions 23 and aligned to the mouth 21. When the tubular member 30 is at the lie-flat position P2, the assembling portion 31 is coupled to the two second positioning portions 24 and aligned to the outer surface of the box body 20, so that the user can choose to use. In this embodiment, the first positioning opening 231 is formed between the two first positioning portions 23, and the second positioning opening 241 is formed between the two second positioning portions 24, when the tubular member 30 is in the upright position P1, the tubular member 30 is clamped in the first positioning opening 231 by the two first positioning portions 23, and when the tubular member 30 is in the lie-flat position P2, the tubular member 30 is clamped in the second positioning opening 241 by the two second positioning portions 24, so that the two second positioning portions 24 and the two first positioning portions 23 can be firmly fixed to prevent the tubular member 30 from pivoting with respect to the box body 20.

The shaft 40 has one end connected to the connecting portion 32 of the tubular member 30, and another end provided with a clamping portion 41 for insertion of the cleaning tool A. With the clamping portion 41, the cleaning tool A, when not in use, can be stably clamped by and inserted in the clamping portion 41, so that the shaft 40 and the cleaning tool A can be conveniently and quickly assembled together, which can prevent the cleaning tool A from falling down and keeping the foot of the cleaning tool A at a distance from the ground.

The two roller units 50 are disposed at one end of the box body 20 and aligned to the two supporting feet 22. In this embodiment, the two roller units 50 each include two connecting legs 51 disposed on the box body 20, and two rollers 52 respectively connected to the two connecting legs 51. As compared with the conventional cleaning tool set that must be manually lifted up while being moved, the two roller units 50 of the invention allow the user to pull the shaft 40 to move the cleaning tool when the tubular member 30 is in the upright position P1, so as to achieve the effect of labor saving.

Figure 3:
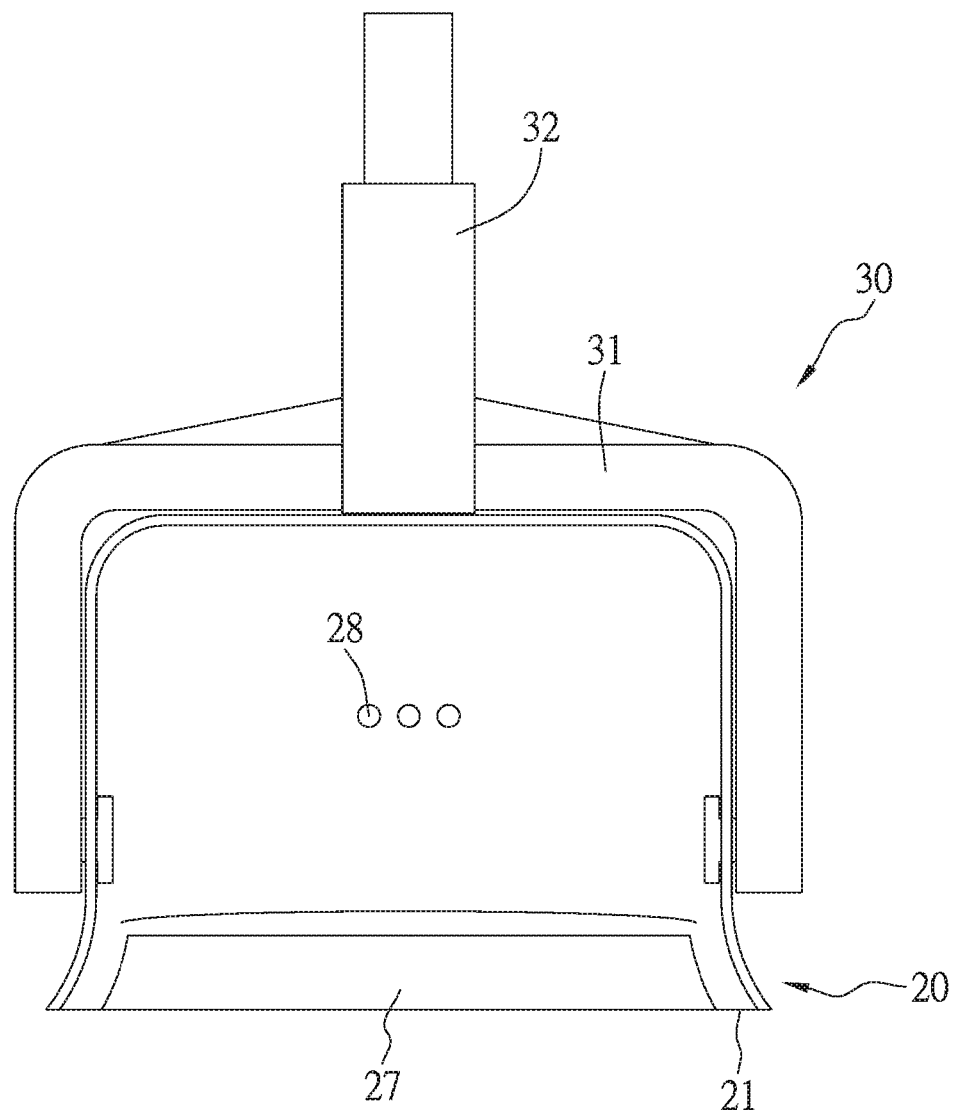
FIG. 3 is a magnified view of a part of the portable dustpan structure for cleaning pet excrement in accordance with the present invention.
Figure 4:
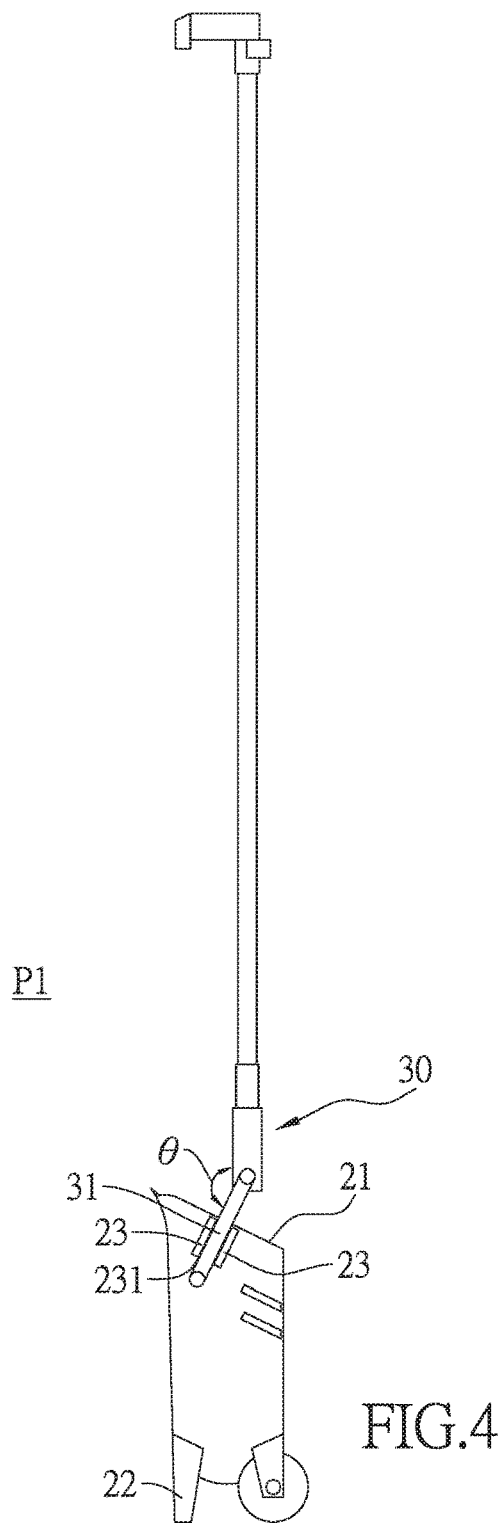
FIG. 4 is an illustrative view of the invention showing that the tubular member is in the upright position.
Figure 5:
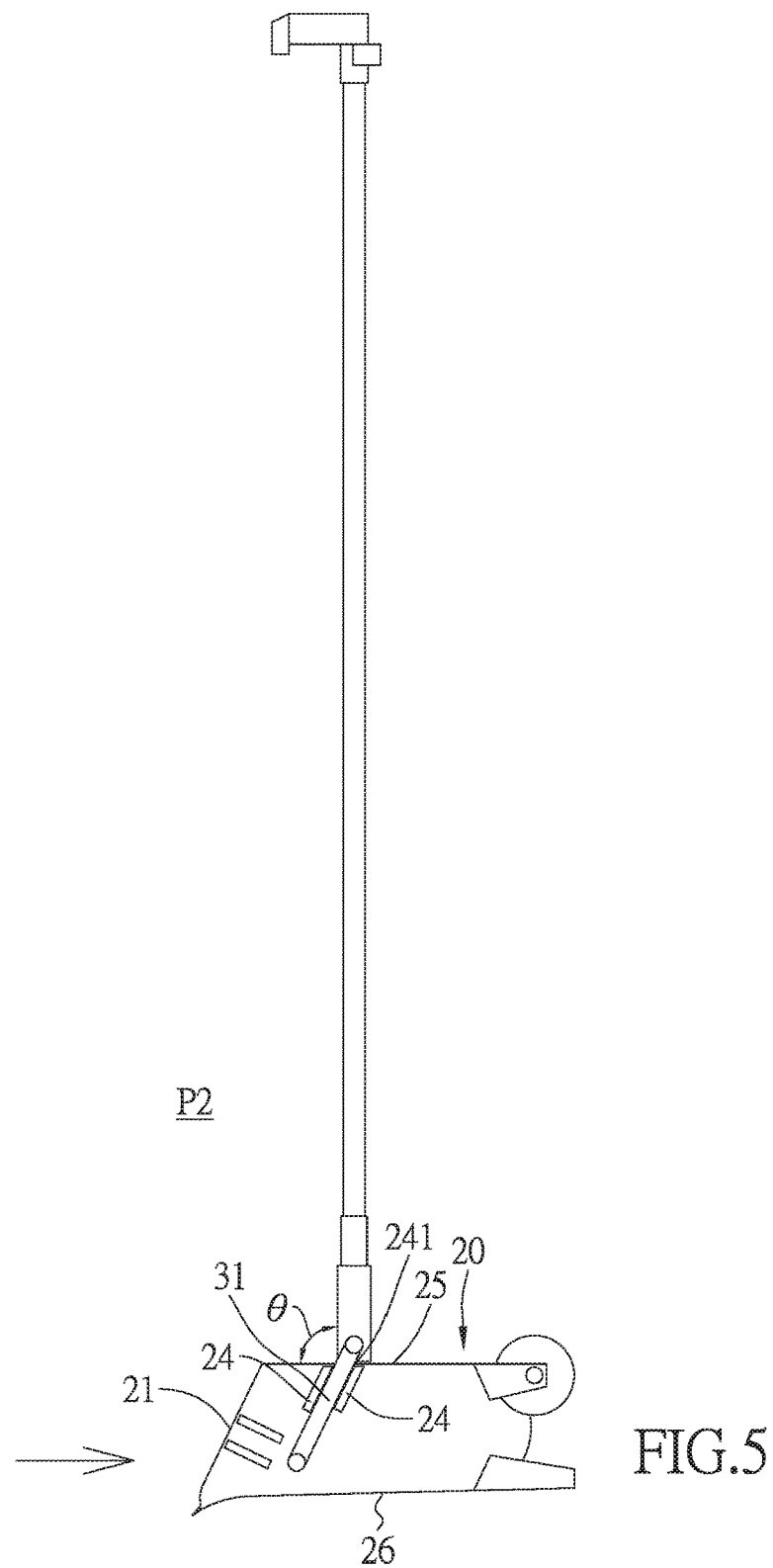
FIG. 5 is an illustrative view of the invention showing that the tubular member is in the lie-flat position.

The use of the portable dustpan structure for cleaning pet excrement in accordance with the present invention is further illustrated by referring to FIGS. 3 and 4. The tubular member 30 is clamped in the first positioning opening 231 by the two first positioning portions 23 when it is pivoted to the upright position P1 by the fixed angle θ, at this position, the mouth 21 opens upwards and the assembling portion 31 is aligned with the mouth 21. The box body 20 is held in an upstanding position by the two supporting feet 22 to prevent the excrement of the pet from falling out. In addition, when the tubular member 30 is in the upright position P1, the overall volume of the cleaning tool is reduced, which is convenient for the pet owner to carry or easy for storage. Besides, the possibility that the box body 20 get kicked by the passersby is greatly reduced, which improves the safety of the passersby, and the box body 20 won't get kicked down and get damaged. It is worth mentioning that, when in the upright position P1, one end of the flat rake A can be inserted into the box body 20 to achieve the advantage of facilitating towing. Since the plurality of drain holes 28 penetrate the box body 20, after the box body 20 is washed, and the box body 20 is pivoted to the upright position P1, the drain holes 28 allow the box body 20 to be effectively drained and dried. Referring to FIG. 5, the tubular member 30 is clamped in the second positioning opening 241 by the two second positioning portions 24, when it is pivoted to the lie-flat position P2 by the fixed angle θ, at this position, the assembling portion 31 of the tubular member 30 is aligned to the top surface 25 of the box body 20, so as to facilitate the pet owner to rake the pet excrement through the mouth 21 into the box body 20.

What mentioned above are the structural configurations of the portable dustpan structure for cleaning pet excrement in accordance with the present invention and their connection relations.

In this way, the present invention provides a portable dustpan structure for cleaning pet excrement, which essentially comprises: the box body 20, the tubular member 30, the shaft 40 and the two roller units 50. The tubular member 30 is pivotable relative to the box body 20 to move between the upright position P1 and the lie-flat position P2. When the tubular member 30 is in the upright position P1, the mouth 21 of the box body 20 is upwards, the pet excrement won't fall out, and it can save space for easy storage. When the tubular member 30 is in the lie-flat position P2, the pet owners can rake the pet excrement into the box body 20 via the mouth 21 so as to achieve of the purpose of cleaning.

In addition, the present invention is additionally provided with the two roller units 50, and the pet owner can move the dustpan by directly grasping and pulling the shaft 40, thereby improving the comfort of carrying object, moving without lifting, making the dustpan easy to carry and saving effort.

While we have shown and described various embodiments in accordance with the present invention, it is clear to those skilled in the art that further embodiments may be made without departing from the scope of the present invention.

What is claimed is:

1. A portable dustpan structure for cleaning pet excrement, suitable for connecting a cleaning tool, the portable dustpan structure for cleaning pet excrement comprising:
 a box body having one end of the box body provided with a mouth, and another end of the box body provided with two supporting feet, wherein two sides of the box body are protrusively provided with two first positioning portions and two second positioning portions;
 a tubular member pivotally disposed on the box body, and including an assembling portion capable of being assembled to the two first positioning portions or the two second positioning portions, and a connecting portion connected to the assembling portion, wherein the tubular member is able to pivot between an upright position and a lie-flat position, when the tubular member is in the upright position, the assembling portion is coupled to the two first positioning portions and aligned to the mouth, when the tubular member is in the lie-flat position, the assembling portion is coupled to the two second positioning portions and aligned to an outer surface of the box body;
 a shaft having one end connected to the connecting portion of the tubular member, and another end provided with a clamping portion for insertion of the cleaning tool; and
 two roller units disposed at one end of the box body and aligned to the two supporting feet;
 wherein the box body is provided with a plurality of drain holes between the two supporting feet and the two roller units, a first positioning opening is formed between the two first positioning portions, a second positioning opening is formed between the two second positioning portions, when the tubular member is in the upright position, the tubular member is clamped in the first positioning opening by the two first positioning portions, and when the tubular member is in the lie-flat position, the tubular member is clamped in the second positioning opening by the two second positioning portions.

2. The portable dustpan structure for cleaning pet excrement as claimed in claim 1, wherein the assembling portion and the connecting portion of the tubular member are integrally formed with each other.

3. The portable dustpan structure for cleaning pet excrement as claimed in claim 1, wherein the box body further includes a scraping strip which is integrally formed at an edge of the mouth.

4. The portable dustpan structure for cleaning pet excrement as claimed in claim 1, wherein a fixed angle is formed between the assembling portion and the connecting portion of the tubular member, and the tubular member pivots within the fixed angle.

5. The portable dustpan structure for cleaning pet excrement as claimed in claim 1, wherein the two roller units each include two connecting legs disposed on the box body, and two rollers respectively connected to the two connecting legs.

6. The portable dustpan structure for cleaning pet excrement as claimed in claim 1, wherein the cleaning tool is a flat rake or a broom.

\* \* \* \* \*